Figure 1:
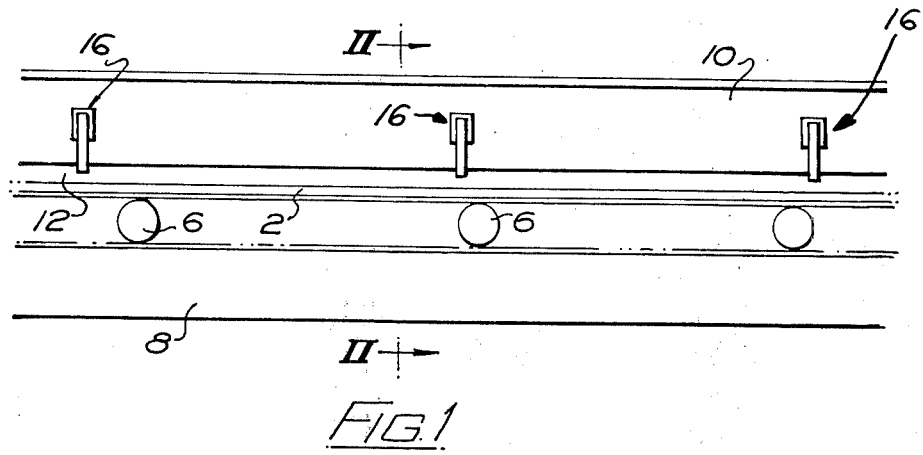

United States Patent [19]
Ward

[11] 3,989,137
[45] Nov. 2, 1976

[54] CLAMPING MEANS FOR CONVEYOR MECHANISMS

[76] Inventor: Charles William Ward, 35 Central Blvd., Wheatley Hills, Doncaster, England

[22] Filed: Sept. 9, 1975

[21] Appl. No.: 611,812

[30] Foreign Application Priority Data
Sept. 23, 1974 United Kingdom............... 41325/74

[52] U.S. Cl............................ 198/836; 198/192 R
[51] Int. Cl.².......................................... B65G 15/60
[58] Field of Search............ 248/316 E; 24/132 WL; 198/137, 191, 192, 204

[56] References Cited
FOREIGN PATENTS OR APPLICATIONS
1,256,691  12/1971  United Kingdom................. 198/204

Primary Examiner—William H. Schultz
Attorney, Agent, or Firm—Browdy and Neimark

[57] ABSTRACT

Clamping means for a conveyor system, including means for retaining a cam member in abutting relation with a lever bearing against a flexible skirt, said means including a detent wheel pivotally mounted for movement with said cam member and an element acting against the periphery of the detent wheel in such a manner that it allows movement of the cam member into abutment with the lever but prevents its movement away from said lever until released from engagement with the periphery of the detent wheel.

9 Claims, 4 Drawing Figures

CLAMPING MEANS FOR CONVEYOR MECHANISMS

This invention relates to clamping means for use on conveyor mechanisms and has for its object to provide an improvement therein.

Conveyor systems are in common use for conveying coal, ores and such like material. Such conveyor systems generally comprise a conveyor belt supported so as to form a trough, metal side walls extending downwardly to the vicinity of but not touching the belt and means for securing flexible skirts to the side walls so that they extend to the belt. The side walls and flexible skirts prevent the material from spreading sideways and spilling off the conveyor belt. In use, the lower edges of the flexible skirts become worn due to abrasion and require periodically to be lowered and eventually replaced. The lowering and replacement of the flexible skirts has hitherto proved to be a time consuming operation. The object of the invention is to provide an improved clamping means applicable to such conveyor systems.

According to the invention, there is provided clamping means for a conveyor system, said clamping means including a mounting means, an elongate lever of which one end is connected to the mounting means so as to be capable of being swung relative thereto, a cam member pivotally mounted on the mounting means so that it can be caused to bear against the lever intermediate its ends whereby the free end of said lever can be caused to bear against a flexible skirt of the conveyor system to which the clamping means are fitted or are to be fitted, and means for retaining the cam member in abutting relation with the lever said means including a detent wheel pivotally mounted for movement with said cam member and an element acting against the periphery of the detent wheel in such a manner that it allows movement of the cam member into abutment with the lever but prevents its movement away from said lever until released from engagement with the periphery of the detent wheel. The element which acts against the periphery of the detent wheel will preferably be a friction grip member pivotally mounted so that it moves into jamming relation with said detent wheel to prevent movement of the cam member away from the lever. Said element may be mounted in such a way that it falls into engagement with the periphery of the detent wheel under its own weight and may itself be in the form of a wheel mounted for rotation about an eccentric axis, in which case it will preferably be provided with a peripheral flange which during normal use partly overlies the face of the detent wheel to retain the latter in position. The cam member and the detent wheel will preferably be mounted on a removable pin extending through aligned holes in side plates of the mounting means so that when the pin and cam member have been removed the lever is able to be swung clear of the flexible skirt to facilitate the replacement of a worn skirt. The lever will preferably be mounted so as to extend intermediate the pair of side plates of the mounting means, being of a width less than their distance apart. Preferably, also, said one end of the lever will be connected to the mounting means in a manner facilitating its connection thereto and its disconnection therefrom, for example by that end of the lever having the form of a shepherds crook and being a snap fit on a pivot pin extending between the side plates of the mounting means, said pivot pin conveniently being welded in position. The lever will preferably have the form of a spring tongue so that when the cam member is caused to bear against the lever intermediate its ends the free end of said lever is caused to bear against the flexible skirt resiliently.

Figure 2:
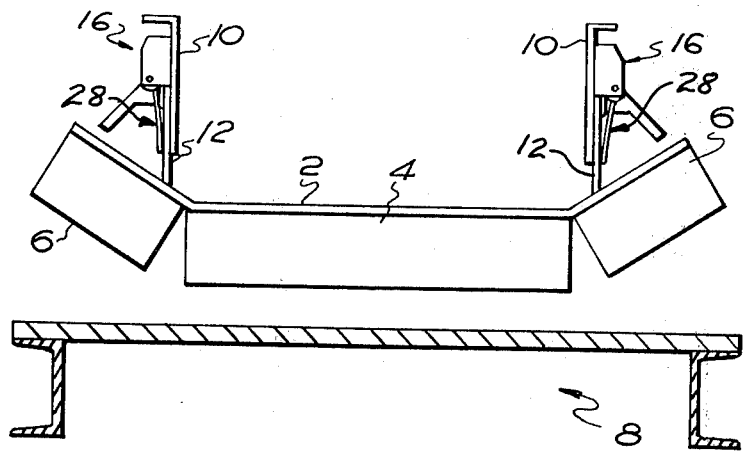
Figure 3:
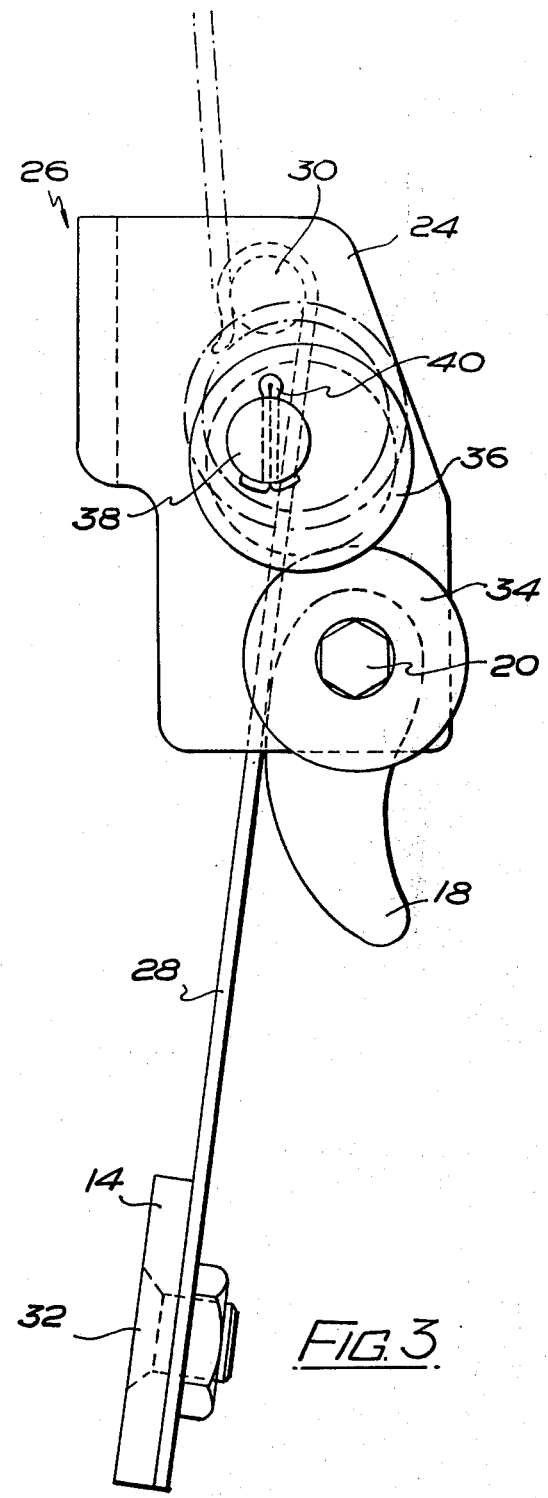
Figure 4:
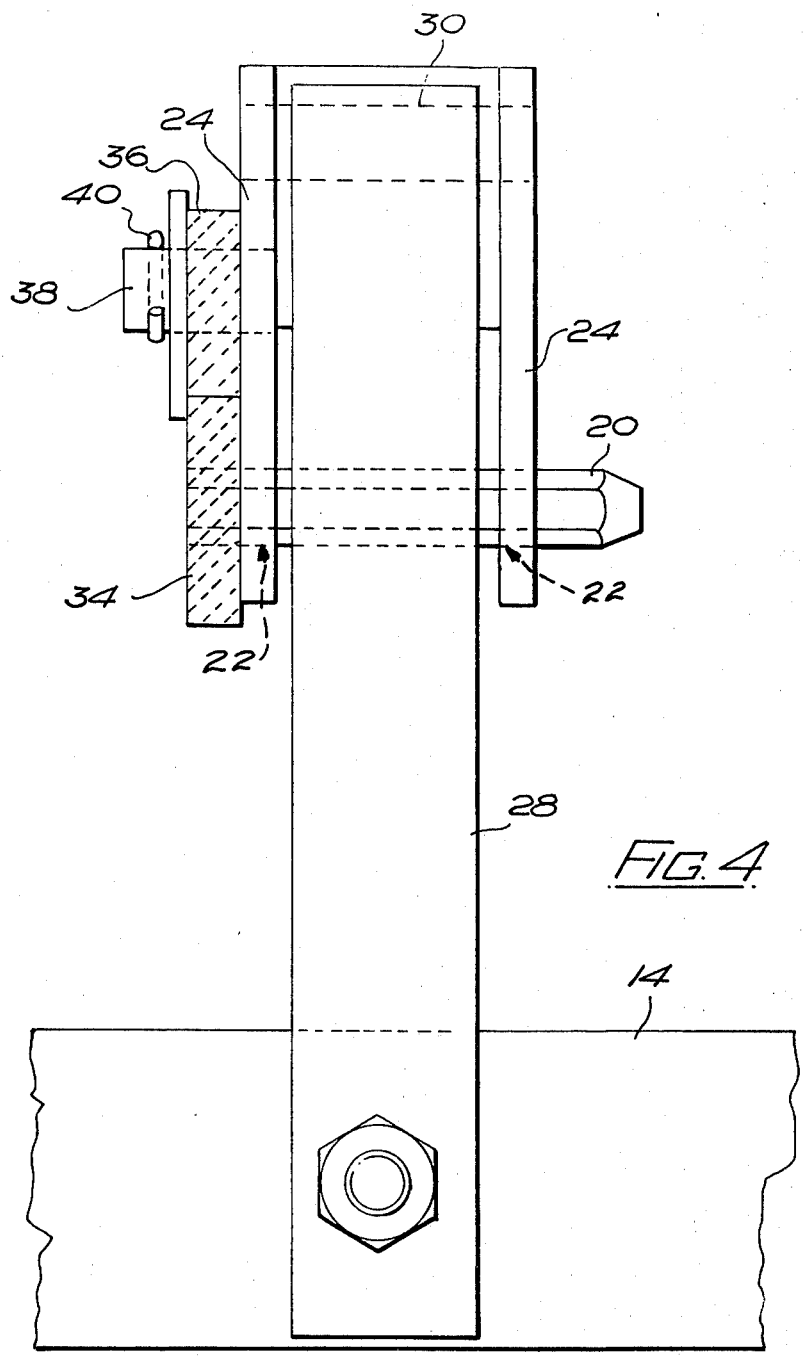

In order that the invention may be clearly understood and readily carried into effect, a form of clamp embodying the invention will now be described, by way of example only, with reference to the accompanying drawings, in which:

FIG. 1 shows in side elevation a conveyor system to which the clamps are fitted, FIG. 2 is an end section along the line II—II of FIG. 1, and FIGS. 3 and 4 are respectively a side elevation and a front elevation of one of the clamps.

Referring to FIGS. 1 and 2 of the drawings, there is there illustrated a conveyor system, having a conveyor belt 2 supported in the centre by support rollers 4 and at each side by troughing rollers 6 to render the belt trough-shaped when in use. The rollers are supported from a conveyor support frame 8 by conventional means (not shown). Vertically mounted metal skirt plates 10 constitute side walls extending downwardly into the vicinity of but not touching the belt 2 near the sides of the belt, i.e. where it is supported by the troughing rollers 6. The skirt plates 10 are also supported from the support frame 8 in conventional manner (likewise not shown). A flexible rubber skirt 12 extends from each skirt plate 10 to the belt 2 and is held in position by means of a clamping strip 14 (or by a number of such clamping strips along the length of the skirt) the or each clamping strip being carried by a series of spaced clamps 16 secured to the metal skirt by welding.

Referring now to FIGS. 3 and 4, it will be seen that each clamp includes a cam member 18 mounted on a pin 20 made from a length of hexagonal bar which extends through aligned holes 22 in side plates 24 of respective mounting means 26 (each mounting means comprising a backplate which can be welded to the metal skirt of the conveyor with the side plates formed integrally with said back plate) and each cam member is able to bear against a lever 28 having the form of a spring tongue, intermediate the ends of said lever, to move it to its clamping position. One end of the lever has the form of a shepherds crook, as shown in FIG. 3, and is a snap fit on a pivot pin 30 which is welded in position extending between the side plates of the mounting means. The other end of the lever of each clamp is secured to the clamping strip 14 by nut and bolt assemblies 32, the head of the bolt being countersunk in the clamping strip 14 so as not to project therefrom.

Means are provided for retaining the cam member in abutting relation with the lever 28 and applying a required amount of pressure against the lever, said means including a detent wheel 34 which is fixed on the pin 20 at one end thereof for movement with the cam member. A friction grip member in the form of a peripherally flanged wheel 36 is pivotally mounted about an eccentric axis on a pivot pin 38 which is welded to one of the side plates, as shown, to project sideways therefrom. The arrangement is such that the flanged wheel falls into engagement with the periphery of the detent wheel under its own weight and moves into jamming relation with said detent wheel to prevent movement of the cam member away from the lever 28. In this position the peripheral flange of the wheel partly overlies the face of the detent wheel as shown in FIGS. 3 and 4 to retain the detent wheel in position. A split pin 40 retains the flanged wheel 36 on the pivot pin 38. An extraneous tool (not shown) can be applied to the projecting end of the pin 20 so that the cam can be urged further into engagement with the lever whereby a required amount of pressure can be applied by the clamping strip 14 against the flexible rubber skirt.

In use, when coal, ore or other like material is carried by the conveyor belt, it is prevented from spilling sideways by the presence of the skirt plates 10 and rubber skirts 12 extending to the sides of the trough formed by the belt. When the rubber skirt has become worn by abrasion it is a simple matter to lower it. To do so, the extraneous tool referred to above is applied to the projecting end of the pin 20 and sufficient pressure is applied to relieve the detent wheel 34 and flanged wheel 36 of any load so that the latter can then be rotated by hand away from the periphery of the detent wheel. The tool can then be removed so that the lever is relieved of the load previously applied against it by the cam member and the flexible rubber skirt can be lowered by the extent required when the clamps of a series of such clamps have been released in this way. Thereupon, the skirt can be again clamped in position by re-applying the loads on the levers as previously explained. When, after having been repeatedly lowered, the rubber skirt has become worn to such an extent that it needs to be replaced, it is an easy matter to remove it, after having removed the pins 20 and the cam members 18 and having swung the levers and clamping strips clear of the flexible skirt, and to insert a replacement skirt and clamp it in position.

The removal of the pin 20 and the cam member 18 from each of the clamping means in turn is facilitated by the fact that release of the friction grip member from the periphery of the detent wheel removes all pressure from the lever. The removable pins and cam members can therefore be extracted by hand very easily when the flanged wheel 36 of each clamp has been released of all load and rotated away from the detent wheel to the position shown in chain-dotted lines in FIG. 3 as previously described. When the pins 20 and cam members 18 have been removed, the levers 28 of a series of the clamping means, together with the clamping strip 14 to which they are connected can be raised to an inoperative position as shown in chain-dotted lines in FIG. 3. When thus swung out of the way (by 180° or more) neither the clamping strip nor the levers get in the way when replacing the rubber skirt. In addition, it will be understood that when it is desired to completely remove the levers or to re-fit them, this is facilitated by the ends of the levers having the form of shepherds crooks, that is to say, being each a snap fit on its pivot pin.

Various modifications may be made without departing from the scope of the ivention. For example, instead of the means for retaining the cam member in abutting relation with the lever including a friction grip member it could include a pawl engageable with teeth formed around the periphery of the detent wheel. Furthermore, the friction grip member or the pawl as the case may be could be acted upon by a spring arranged to urge it into engagement with the periphery of the detent wheel. It will of course be obvious that a fricton grip member need not necessarily be a complete wheel and need not necessarily be flanged. The mounting means need not be secured to the metal skirt of the conveyor by welding. Bolted connections could equally well be used.

What I claim and desire to secure by Letters Patent is:

1. In clamping means for the flexible side skirt of a conveyor system, a mounting means; an elongate lever of which one end is connected to said mounting means for pivotal movement relative thereto; a cam member pivotally mounted on said mounting means and adapted to bear against the lever intermediate its ends for causing the free end of said lever to bear against the flexible skirt of the conveyor system; and means for retaining the cam member in abutting relation with the lever, said means including a detent wheel pivotally mounted for movement with said cam member and including also an element acting against the periphery of the detent wheel for allowing movement of the cam member into abutment with the lever but for preventing its movement away from said lever until released from engagement with the periphery of the detent wheel.

2. Clamping means according to claim 1, in which the element which acts against the periphery of the detent wheel is a friction grip member pivotally mounted so that it moves into jamming relation with said detent wheel to prevent movement of the cam member away from the lever.

3. Clamping means according to claim 2, in which the friction grip member is mounted in such a way that it falls into engagement with the periphery of the detent wheel under its own weight.

4. Clamping means according to claim 3, in which the friction grip member is in the form of a wheel mounted for rotation about an eccentric axis, and is provided with a peripheral flange which during normal use partly overlies the face of the detent wheel to retain the latter in position.

5. Clamping means according to claim 1, in which the cam member and the detent wheel are mounted on a removable pin extending through aligned holes in side plates of the mounting means so that when the pin and cam member have been removed the lever is able to be swung clear of the flexible skirt to facilitate the replacement of a worn skirt.

6. Clamping means according to claim 5, in which the lever is mounted so as to extend intermediate the pair of side plates of the mounting means, being of a width less than their distance apart.

7. Clamping means according to claim 1, in which said one end of the lever is connected to the mounting means in a manner facilitating its connection thereto and its disconnection therefrom.

8. Clamping means according to claim 7, in which that end of the lever at which it is connected to the mounting means has the form of a shepherds crook and is a snap fit on a pivot pin extending between the side plates of the mounting means.

9. Clamping means according to claim 1, in which the lever has the form of a spring tongue so that when the cam member is caused to bear against the lever intermediate its ends the free end of said lever is caused to bear against the flexible skirt resiliently.

* * * * *